United States Patent [19]

Aronson et al.

[11] Patent Number: 6,128,673
[45] Date of Patent: Oct. 3, 2000

[54] METHOD AND APPARATUS FOR COMMUNICATION AND TRANSLATION OF A PLURALITY OF DIGITAL PROTOCOLS

[76] Inventors: Michael D. Aronson, 3 Barberry Rd., Lexington, Mass. 02173; Joel Silverman, 480 Bryant Ave., Mt. View, Calif. 94040

[21] Appl. No.: 08/970,736

[22] Filed: Nov. 14, 1997

[51] Int. Cl.[7] .................................................. G06F 13/28
[52] U.S. Cl. .............................. 710/22; 710/70; 710/105; 710/12; 710/16; 710/129; 710/64; 710/63
[58] Field of Search .......................... 710/62–65, 72–73, 710/20–23, 31, 33, 128–129, 70, 69, 105, 106, 10, 12, 16

[56] References Cited

U.S. PATENT DOCUMENTS

| | | | |
|---|---|---|---|
| 4,884,287 | 11/1989 | Jones et al. | 375/121 |
| 4,972,470 | 11/1990 | Farago | 380/3 |
| 4,993,956 | 2/1991 | Pickles et al. | 439/76 |
| 5,073,852 | 12/1991 | Siegel et al. | 395/700 |
| 5,539,787 | 7/1996 | Nakano et al. | 375/377 |
| 5,574,859 | 11/1996 | Yeh | 395/200.01 |
| 5,664,204 | 9/1997 | Wang | 713/300 |
| 5,664,229 | 9/1997 | Bhargava et al. | 710/65 |
| 5,781,747 | 7/1998 | Smith et al. | 395/309 |
| 5,793,989 | 8/1998 | Moss et al. | 710/105 |
| 5,794,014 | 8/1998 | Shetty et al. | 395/500 |
| 5,822,251 | 10/1998 | Bruce et al. | 365/185.33 |
| 5,828,905 | 10/1998 | Rao | 710/63 |
| 5,832,244 | 11/1998 | Jolley et al. | 395/309 |
| 5,842,045 | 11/1998 | Nakamura | 710/63 |
| 5,887,198 | 3/1999 | Houlberg et al. | 710/62 |

OTHER PUBLICATIONS

Logic Controls, Inc., IW2000 Intelligent Wedge Cable, Nov. 12, 1997, Web Page.
Smart Cable Company: New Products, Nov. 12, 1997 Web Page.
Methode New England Home Page, Nov. 12, 1997.
B & B Electronics Manufacturing Company Press Release, Oct. 15, 1997 Web Page.
B & B Electronics Manufacturing Company, Oct. 1997 Web Page.

*Primary Examiner*—Ayaz R. Sheikh
*Assistant Examiner*—Raymond N Phan
*Attorney, Agent, or Firm*—Hickman Coleman & Hughes, LLP

[57] ABSTRACT

A digital protocol translator including a first protocol circuitry having a first I/O port adapted to communicate using a first digital protocol, the first protocol circuitry including a first controller. The translator further includes a second protocol circuitry having a second I/O port communicating using a second digital protocol different from the first digital protocol, the second protocol circuitry including a second controller in communication with the first controller, such that communications between the first I/O port and the second I/O port are translated between the first protocol and the second protocol. Preferably, the translator further includes a microprocessor and digital memory, where the microprocessor operates under the control of a program stored in the memory. Also preferably, the first controller includes a first state machine, a first plurality of registers, and a first DMA interface, and the second controller includes a second state machine, a second plurality of registers, and a second DMA interface.

35 Claims, 11 Drawing Sheets

METHOD AND APPARATUS FOR COMMUNICATION AND TRANSLATION OF A PLURALITY OF DIGITAL PROTOCOLS

CROSS REFERENCE TO RELATED APPLICATIONS

This application is related to U.S. patent application Ser. No. 08/970,992, (Atty. Docket No. KLSIP001), filed Nov. 14, 1997 on behalf of inventors Michael Rostoker and Joel Silverman, entitled "Plug-And-Play Data Cable With Protocol Translation", which is incorporated herein by reference for all purposes.

TECHNICAL FIELD

This invention relates generally to digital electronic communication, and more particularly to the translation of digital electronic communication protocols.

BACKGROUND ART

There is often a need or a desire to permit the digital electronic communication between two or more digital electronic apparatus. For example, it is often desirable to have a personal computer interfaced with a local area network (LAN). To implement the digital electronic communication between the computer and the network, various communication protocols have been developed. For example, Ethernet is a common communication protocol used in many local area networks.

In practice, a network card is typically installed in the computer to facilitate a network connection. Often, the network card includes an Ethernet port. A cable assembly, typically including Ethernet connectors at both ends, can be used to connect the Ethernet port of the network card into the network system.

A problem can sometimes arise when apparatus are configured to communicate with different communication protocols. For example, laptop computers are not often provided with Ethernet cards, and therefore cannot directly communicate with Ethernet networks or other apparatus communicating using Ethernet protocols. One solution is to add a PCMCIA Ethernet card to the portable computer to allow its connection to an Ethernet network. However, standard PCMCIA Ethernet cards have considerable associated overhead from both a hardware and a software point of view. Further, the speed of the Ethernet connection is limited by the speed of the PCMCIA interface. External devices that add Ethernet capabilities to laptops undesirably add size and weight to the overall system.

Figure 1A:
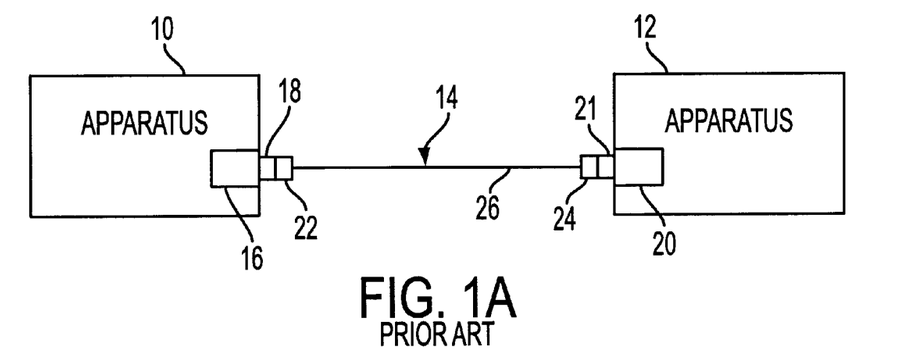
FIGS. 1A–1C illustrate three prior art methods for digital electronic communication.

This communication problem will be further explained with reference to FIGS. 1A–1C. In FIG. 1A, a first apparatus 10 is coupled to a second apparatus 12 by a cable assembly 14. Apparatus 10 can be, for example, a personal computer provided with a network card 16 having an Ethernet port (connector) 18. The apparatus 12 can be any number of other types of computer equipment including a network hub, a personal computer, a printer, etc., and is provided with its own network card 20 with an Ethernet port (connector) 21. It should be noted that the circuitry of network cards 16 or 20 can be integrated into the electronics of the apparatus 10 or 12, respectively. For example, the circuitry of network card 16 can be provided on the motherboard of a personal computer apparatus 10.

The cable assembly 14 includes a first connector 22, a second connector 24, and a cable 26 extending between the two connectors. Connector 22 engages with connector 18 of Ethernet card 16, and connector 24 engages with connector 21 of Ethernet card 20. Since both apparatus 10 and apparatus 12 are communicating with the same communication protocol, e.g. with an Ethernet protocol, a simple connection by cable assembly 14 suffices to place the two apparatus into digital electronic communication.

A problem arises when apparatus attempt to communicate using two different communication protocols. For example, in FIG. 1B, it may be desirable to have a first apparatus 10 communicate with a second apparatus 12 which communicates by a different communication protocol. For example, the apparatus 10 might be provided with an Ethernet ported network card 16 while apparatus 12 might be provided with a serial communications (e.g. an RS-232) card 28. In such instances, a translator box 30 can be provided which communicates with an Ethernet communication protocol at a first port 32 and with a serial communication protocol at a second port 34. Devices including interface cards are examples of such translator boxes 30.

Figure 1B:
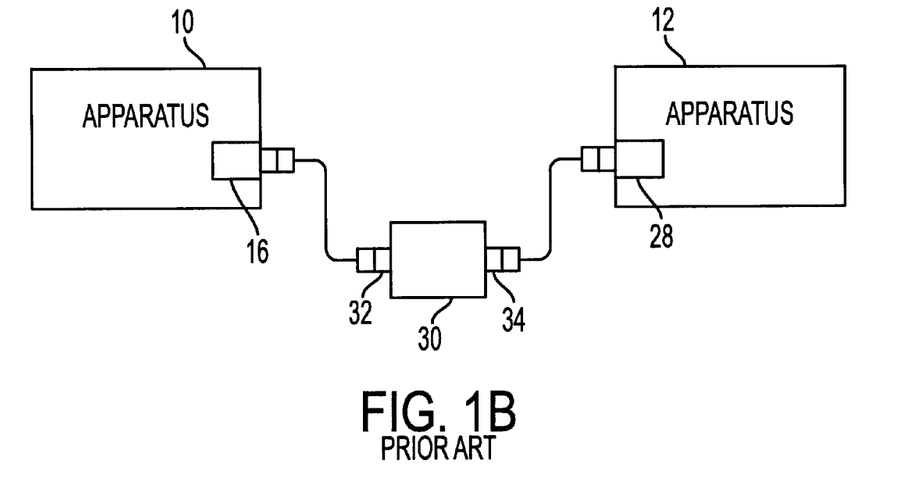
Figure 1C:
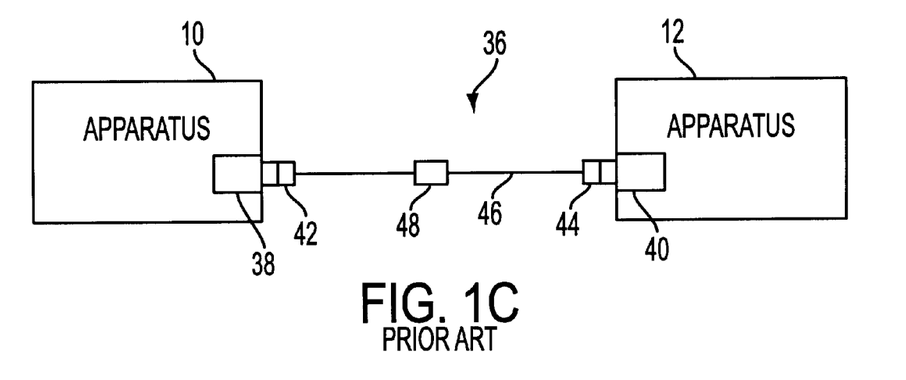

In FIG. 1C, a first apparatus 10 is coupled to a second apparatus 12 by a "smart" cable 36. In an example, the apparatus 10 has a card 38 communicating with a first protocol, and apparatus 12 has a card 40 communicating with a second communication protocol. However, instead of having a separate translator box 30 as in FIG. 1B, the smart cable 36 of FIG. 1C includes embedded circuitry for translating the communication protocol of apparatus 10 into the communication protocol for apparatus 12. For example, apparatus 10 can be a personal computer having a USB card 38 and apparatus 12 can be a printer having a parallel or Centronics card 40. The smart cable 36 then translates the USB protocols of apparatus 10 into Centronics protocols of apparatus 12 and vice versa. The digital circuitry of the smart cable can be located within a connector 42 or a connector 44 of the cable or can be part of the cable 46, e.g. in the form of a dongle 48.

There are several examples of smart cables that are commercially available. For example, Methode New England provides smart cables with built-in termination, hot swap circuitry, and dongle integration. The Smart Cable Company of Tacoma, Wash. produces a FC819/825 smart serial to parallel cable which automatically adjusts itself for serial to parallel or parallel to serial conversion. Logic Control, Inc. markets the IW 2000 Intelligent Wedge Cable which converts RS232 or decoded TIL serial data to keyboard data. Finally, B&B Electronics Manufacturing Company markets the model USBP10 cable which allows universal serial bus ports to be coupled to parallel printers.

The problem with the current generation of smart cables is that they are only available for a limited number of rather simple protocol conversions, and they are not easily upgradable. Further, most of these devices require either a relatively large connector (such as Centronics interface), or a bulky dongle, to house the translation circuitry.

DISCLOSURE OF THE INVENTION

The present invention is a compact yet flexible digital protocol translator. Its integrated design and small form factor allows it to fit into almost any sized connector, thereby eliminating the need for a bulky dongle. For example, the digital protocol translator of the present invention can fit within the relatively small confines of a USB connector.

More particularly, a digital protocol translator in accordance with the present invention includes first protocol circuitry having a first I/O port adapted to communicate using a first digital protocol and second protocol circuitry having a second I/O port communicating using a second digital protocol different from the first digital protocol. The first protocol circuitry includes a first controller, and the second protocol circuitry includes a second controller. The first protocol circuitry and the second protocol circuitry are coupled together, such that communications between the first I/O port and the second I/0 port are translated between the first protocol and the second protocol.

Preferably, the first protocol circuitry and the second protocol circuitry share a common digital memory which can be accessed by direct memory access (DMA). This allows the integrated circuitry to be of a very small form factor for inclusion, for example, in small connectors such as USB connectors. Also preferably, a digital microprocessor is coupled to the digital memory and the first protocol circuitry and the second protocol circuitry to further enhance and enable the functionality of the digital protocol translator.

A method for translating digital communications in accordance with the present invention includes receiving into a first protocol circuitry a first digital communication using a first digital protocol. The first digital communication is processed within the first protocol circuitry under the direction of a first controller. Next, the processed first digital communication output of the first protocol circuitry is received into a second protocol circuitry for processing. The processed first digital communication output is then processed within the second protocol circuitry. Finally, a first translated digital communication is outputted from the second protocol circuitry.

Preferably, the method for translating further includes receiving into the second protocol circuitry a second digital communication using the second digital protocol, and processing the second digital communication within the second protocol circuitry under the direction of the second controller. Further, the method preferably includes receiving into the first protocol circuitry a processed second digital communication output of the second protocol circuitry, processing the processed second digital communication output within the first protocol circuitry, and outputting a second translated digital communication from the first protocol circuitry.

The present invention therefore provides a flexible, efficient, and compact method and apparatus for translating digital communications. The ability to share memory and download communication protocols into the cable permits a small form-factor integrated circuit which can be updated as needed with suitable drivers.

These and other advantages of the present invention will become apparent to those skilled in the art upon the reading of the following descriptions and a study of the various figures of the drawings.

BRIEF DESCRIPTION OF THE DRAWINGS

FIGS. 7A-1 and 7A-2 are collectively a flow diagram of the "Handle Transmit Request" process of FIG. 7;

BEST MODES FOR CARRYING OUT THE INVENTION

Figure 2:
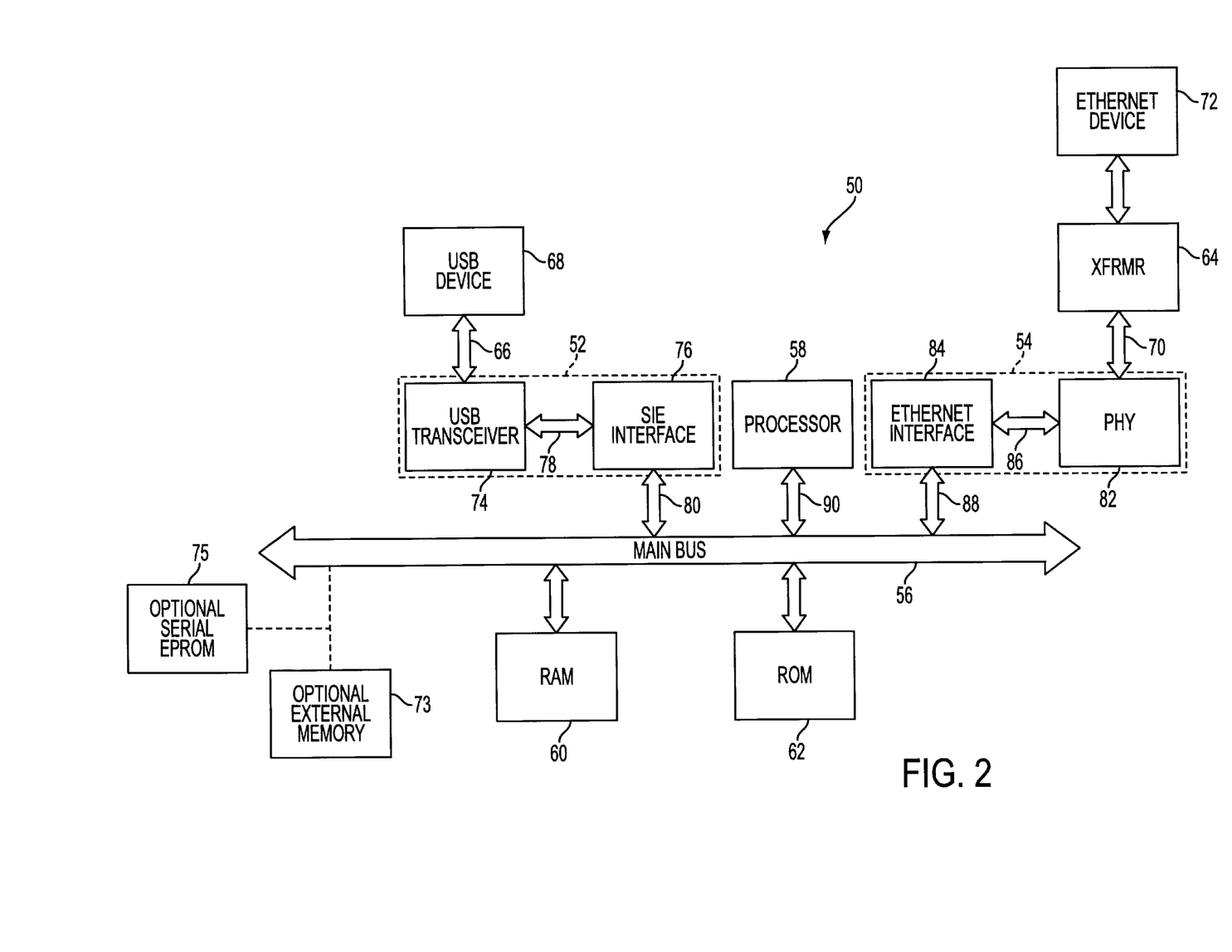
FIG. 2 is a block diagram of a digital protocol translator in accordance with the present invention.

FIGS. 1A–1C were discussed previously in terms of the prior art. In FIG. 2, a digital protocol translator 50 in accordance with the present invention includes first protocol circuitry 52, second protocol circuitry 54, a main bus 56, a microprocessor 58, random access memory (RAM) 60, read only memory (ROM) 62, and a transformer 64. In one preferred embodiment, all but the transformer 64 is integrated onto a single silicon substrate (chip). In other preferred embodiments, several chips are used, e.g. the PHY or physical interface portion of the second protocol circuitry 54 may be provided on a separate chip.

In this example, the first protocol circuitry 52 has a first I/O port 66 that can communicate with a USB device 68, and second protocol circuitry 54 has a second I/O port 70 communicating with an Ethernet device 72 via transformer 64. Communications between the first I/O port 66 and a second I/O port 70 are translated between a first protocol (a USB protocol in this example) and a second protocol (the Ethernet protocol in this example). Optional external memory 73 (e.g. SRAM, DRAM, or ROM) and optional serial EPROM 75 can be coupled to the main bus 56. The optional external memory can be used if the amount of "on-chip" memory is insufficient for certain applications, while the EPROM can be used to store product code information from the manufacturer, who may buy the cable assembly as an OEM product.

The USB device 68 can be any type of USB device, including a USB port on, for example, a laptop computer. The Ethernet device 72 can be any form of Ethernet device including, for example, an Ethernet port on a local area network. Alternatively, the Ethernet device can be an Ethernet card in a personal computer system or in a computer peripheral device, such as an external hard disk drive. The transformer 64 provides galvanic isolation between the second protocol circuitry 54 and the Ethernet device 72.

The first protocol circuitry 52 includes a USB transceiver 74 and a SIE interface 76. The USB transceiver 74 is coupled to port 66 and is coupled to the SIE interface 76 by a bus 78. The SIE interface 76 is coupled to the main bus by a bus 80.

The second protocol circuitry 54 includes a PHY 82 and an Ethernet interface 84. The PHY is coupled to the I/O port 70 and is coupled to the Ethernet interface by a bus 86. The Ethernet interface 84 is coupled to the main bus 56 by a bus 88.

The microprocessor 58 is a general purpose microprocessor which can execute program instructions via the main bus 56. In this instance, the microprocessor 58 is a 16-bit microprocessor of proprietary design, however, there are many processors that are commercially available that would also be suitable. For example, the 8051 microprocessor available from Intel Corporation is suitable for this purpose.

RAM 60 is preferably static random access memory (SRAM) and is available as read/write or "scratch pad" memory that can be used by the first protocol circuitry 52, the second protocol circuitry 54, and the microprocessor 58.

The present implementation currently has three kilobytes of static RAM 60. The ROM 62 is read-only, non-volatile and "static" memory which stores the basic operating system instructions for the microprocessor 58. In the current system, the ROM is preferably eight kilobytes.

The construction and use of many of the components of the translator 50 are well known to those skilled in the art. For example, the making and using of USB transceiver 74, Function SEE 92, RAM 60, ROM 62, microprocessor 58, function MAC 172 and PHY (physical interface) 82 are all well known to those skilled in the art. For example, in the presently described embodiment, the MAC is a 10 Mhz Ethernet MAC. Designs for most of these components are readily licensable from a number of sources. Therefore, these well-known components will either not be discussed in any great detail herein, or will just be discussed briefly, as in the case of the Function SIE 92 and PHY 82.

As noted, Function SIE 92 designs are readily available on the commercial market. Briefly, the Function SIE uses a slave oriented, eight-bit bus interface. The interface signals are divided into four groups as follows:

1) Status: provides output information regarding the results of the last attempted USB transaction;
2) Control: Function input to the SIE to control the state transactions of the SIE state machine based upon valid address/endpoint values, availability of buffer space or data, and error conditions;
3) Bus Interface: interface signals to access data to and from the SIE; and
4) Transceiver Interface: interface signals to connect the SIE to a USB compatible differential transceiver.

The PHY 82 implements the PCS (Physical Coding Sublayer) function allowing for a glue-less interface to a TP-PMD (Twisted Pair Physical Medium Dependent) PHY with a Manchester ENDEC (ENCoder DECoder). Both full and half duplex operational modes are supported.

Preferably, the PHY 82 is configurable to allow CRC generation, the padding of small packets to a minimum packet size, and transmission of giant (e.g. >1518 byte) packets. In addition, the PHY 82 preferably provides status reporting including CRC errors, excessive collisions, late collisions, transmit FIFO underrun, receive FIFO underrun, and transmitted and received byte counts. Still further, the PHY 82 preferably has built in "jabber" protection and loss of carrier and SQE (Signal Quality Error) detection.

In operation, the digital protocol translator 50 of the present invention receives into the first protocol circuitry 52 a first digital communication using a first digital protocol. In this example, the first digital protocol is the "Universal Serial Bus" or USB protocol. This first digital communication is processed within the first protocol circuitry 52 under the direction of a first controller forming a part of the SIE interface 76. An output of the first protocol circuitry 52, i.e. a processed first digital communication, is received into second protocol circuitry 54, and is then processed within the second protocol circuitry. Finally, the second protocol circuitry 54 outputs a translated first digital communication on the I/O port 70.

It should be noted that the operation of the digital protocol translator 50 is bidirectional or "full duplex." Therefore, going in the other direction, the second protocol circuitry 54 can receive a second digital communication using a second digital protocol. In this instance, the second digital protocol is the Ethernet protocol. The second protocol circuitry 54 then processes the second digital communication within the second protocol circuitry under the control of a second controller forming a part of the Ethernet interface 84. Next, a processed second digital communication output of the second protocol circuitry is received into the first protocol circuitry 52 and is then further processed such that there is an output of a translated second digital communication on the I/O port 66.

Figure 3:
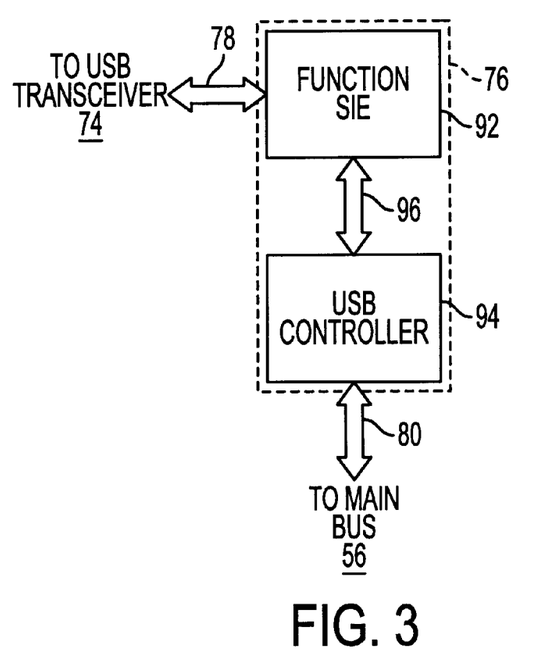
FIG. 3 is a block diagram of the SIE interface of FIG. 2.

In FIG. 3, the SIE interface 76 is illustrated in greater detail. The SIE interface 76 includes a function SIE 92 and a USB controller 94 which is coupled to the function SIE by a bus 96. A function SE communicates with the USB transceiver 74 via the bus 78, and the USB controller 94 communicates with the main bus 56 by a bus 80.

The function SIE 92 is a commercially available design from a number of sources including the USB Interface Forum. The USB controller 94 of the present invention will be discussed in greater detail with reference to FIG. 3A.

Figure 3A:
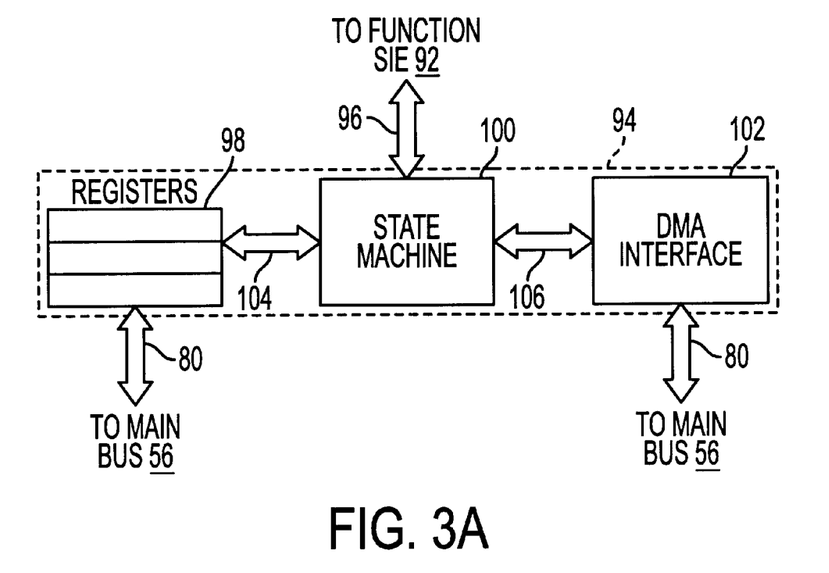
FIG. 3A is a block diagram of the USB controller of FIG. 3.

In FIG. 3A, the USB controller 94 includes a number of registers 98, a state machine 100, and a DMA interface 102. The registers are preferably sixteen bit wide registers and can be written to and read from the main bus 56 via the bus 80. The registers are used to store a number of variables and control bits used to implement the processes of the present invention.

The DMA interface 102 can communicate with the main bus 56 through the bus 80. In addition, the state machine 100 can communicate with registers 98 via a bus 104, and can communicate with the DMA interface 102 via a bus 106. The state machine 100 is further in communication with the function SIE 92 via the aforementioned bus 96.

Figure 4:
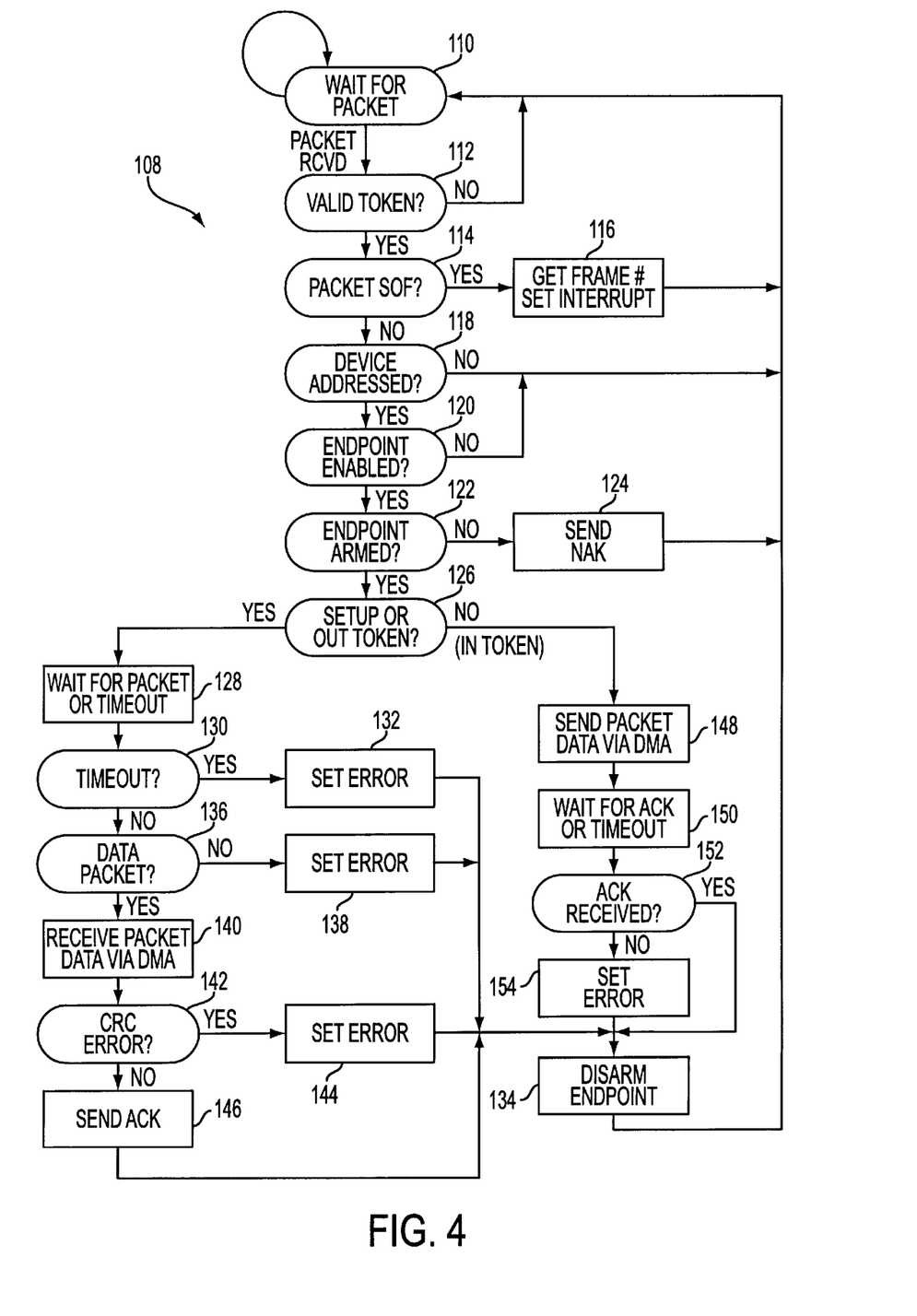
FIG. 4 is a flow diagram of the processes implemented by the state machine of FIG.3A.

State machine 100 implements a process 108 illustrated in FIG. 4. The state machine is preferably implemented as an Application Specific Integrated Circuit (ASIC) embodying the functionality of process 108. The ASIC is preferably designed with the aid of a Verilog program or the like and synthesized to a gate level implementation with behavioral synthesis tools, as is well known to those skilled in the art.

In FIG. 4, process 108 of the state machine 100 begins at 110 with the waiting for a data packet, i.e. a block of data with a header and with check information appended thereto. Once a data packet has been received, a decision 112 is made whether the token for the packet is valid. A token is a data packet that indicates how to handle a subsequent packet. If not, process control returns to the wait loop 110. If Decision 112 determines that the token is valid, a step 114 then determines if the packet is SOF. The SOF is the "Start of Frame", and occurs once a millisecond. If it is, an action 116 receives the frame's number, sets the interrupt, and returns process control to the wait loop 110.

If decision 114 determines that the packet is not SOF, a decision 118 determines if the device is being addressed. If not, process control is returned to wait loop 110 and, if so, a decision 120 determines whether the end point is enabled. As is well known to those skilled in the art, each USB device accommodates multiple "endpoints" or "pipes." If not, process control is again returned to the wait loop 110. If the end point is enabled, a decision 122 determines whether the end point is armed, i.e. if it is ready to accept or transmit data. If not, an action 124 sends a NAK (a token indication that it is not ready to accept data) and process control returns to wait loop 110. If decision 122 determines that the end point is armed, a decision 126 determines whether it is a setup (i.e. an indication that a control transfer follows) or an out token (indicating that output data follows). If it is, an action 128 waits for the packet or for a "time out."

If decision 130 determines that there is a time out, an action 132 sets an error and an action 134 disarms the end point. Process control then returns to the wait loop 110. If decision 130 determines that there is not a time out, a decision 136 determines whether it is a data packet. If not, an action 138 sets an error bit, and action 134 disarms the end point before turning process control over to the wait loop 110.

If decision 136 determines that there is a data packet, then action 140 receives the packet data via direct memory access (DMA). A decision 142 then determines if there was a CRC error and, if so, an action 144 sets an error bit before turning over process control to action 134 to disarm the end point. A CRC error check is determined by check bits that indicate whether valid data was received. Process control then returns to the wait loop 110. Finally, if decision 142 determines that there is not a CRC error, an acknowledgment is sent in an action 146. Process control then returns to action 134.

If decision 126 determines that it is not a "setup" or an "out token", i.e. it is an "in token", action 148 sends packet data via DMA into the memory. Next, an action 150 waits for an acknowledgment (ACK) for a time out. If decision 152 determines that an ACK has been received, action 134 disarms the end point and process control returns to the wait loop 110. Otherwise, action 154 sets the error bit, action 134 disarms the end point, and process control again returns to the wait loop 110.

Figure 5:
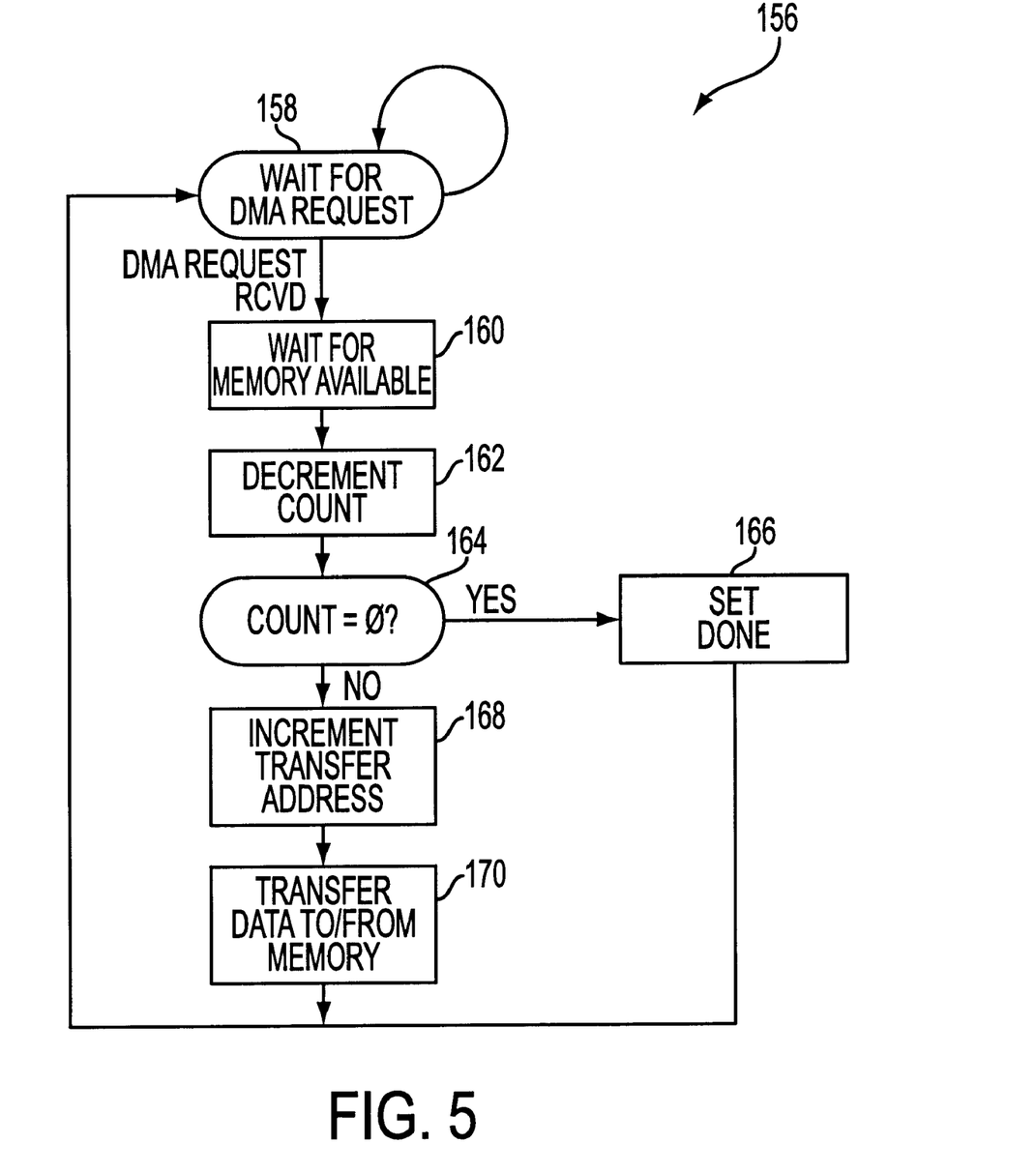
FIG. 5 is a flow diagram of the processes implemented by the DMA interface of FIG. 3A.

In FIG. 5, the process 156 implemented by the DMA interface is illustrated in flow diagram form. Preferably, the process 156 is implemented by a state machine within the DMA interface 102, as will be appreciated by those skilled in the art. The process 156 begins with a wait loop 158 which awaits a DMA request. When wait loop 158 receives a DMA request, it waits for a "memory available" signal in an action 160. When memory is available, action 162 decrements the count, i.e. the size of the memory block for the start of the DMA action, and then a decision 164 determines if the count has reached zero. If the count has reached zero, a action 166 sets a "done" flag, and process control returns to the wait loop 158.

If count is not equal to zero as determined by the decision 164, an action 168 increments the transfer address, i.e. a memory location for the start of the DMA process. Action 170 then transfers data to or from memory, and process control returns to the wait loop 158 to await the next DMA request.

Figure 6:
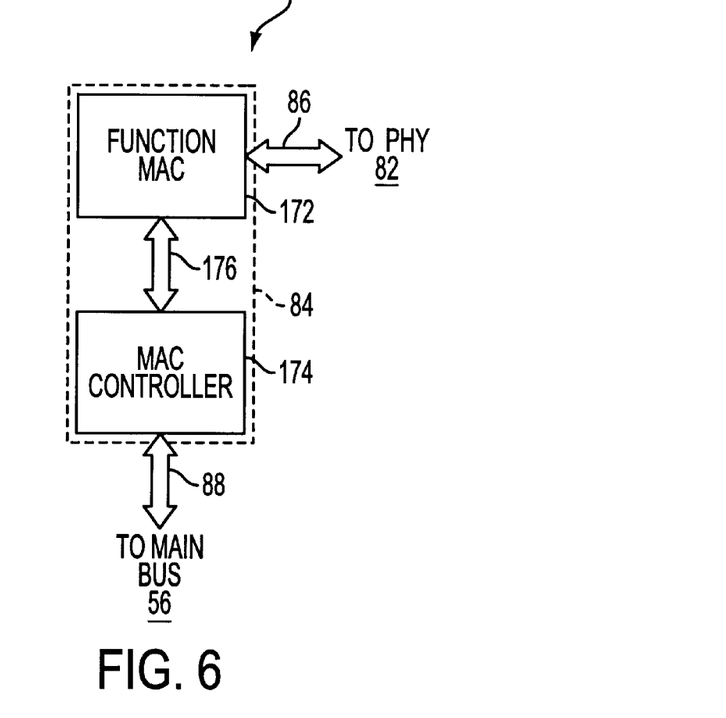
FIG. 6 is a block diagram of the Ethernet interface of FIG. 2.

In FIG. 6, the Ethernet interface 84 is illustrated in greater detail. More particularly, the Ethernet interface 84 includes a function MAC 172 and a MAC controller 174. The function MAC is coupled to a PHY 82 by the bus 86, and is coupled to the MAC controller 174 by a bus 176. The MAC controller 174 is coupled to the main bus 56 by the bus 88.

Figure 6A:
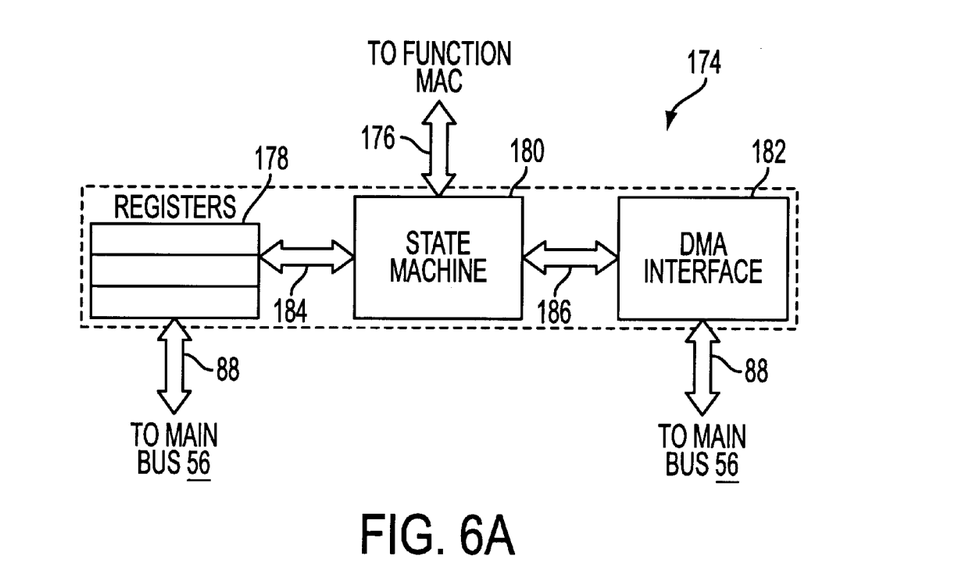
FIG. 6A is a block diagram of the MAC controller of FIG. 6.

In FIG. 6A, a MAC controller 174 includes a plurality of registers 178, a state machine 180, and a DMA interface 182. The plurality of registers 178 are coupled to the main bus 56 by the bus 88. In addition, the registers 178 are coupled to the state machine 180 by a bus 184, and the state machine 180 is coupled to the DMA interface 182 by a bus 186. The DMA interface 182 communicates with the main bus 56 by the bus 88.

As noted previously, the MAC controller 174 is of very similar design to the USB controller 94 described with reference to FIG. 3A. It will therefore be appreciated that the state machine is again preferably an ASIC. Likewise, the DMA interface 182 is of very similar if not identical design to the DMA interface 102 of FIG. 3A. It will be appreciated that the DMA interface 182 operates substantially the same way as described with process 156 of FIG. 5, which will not be repeated here for the purpose of brevity.

Figure 7:
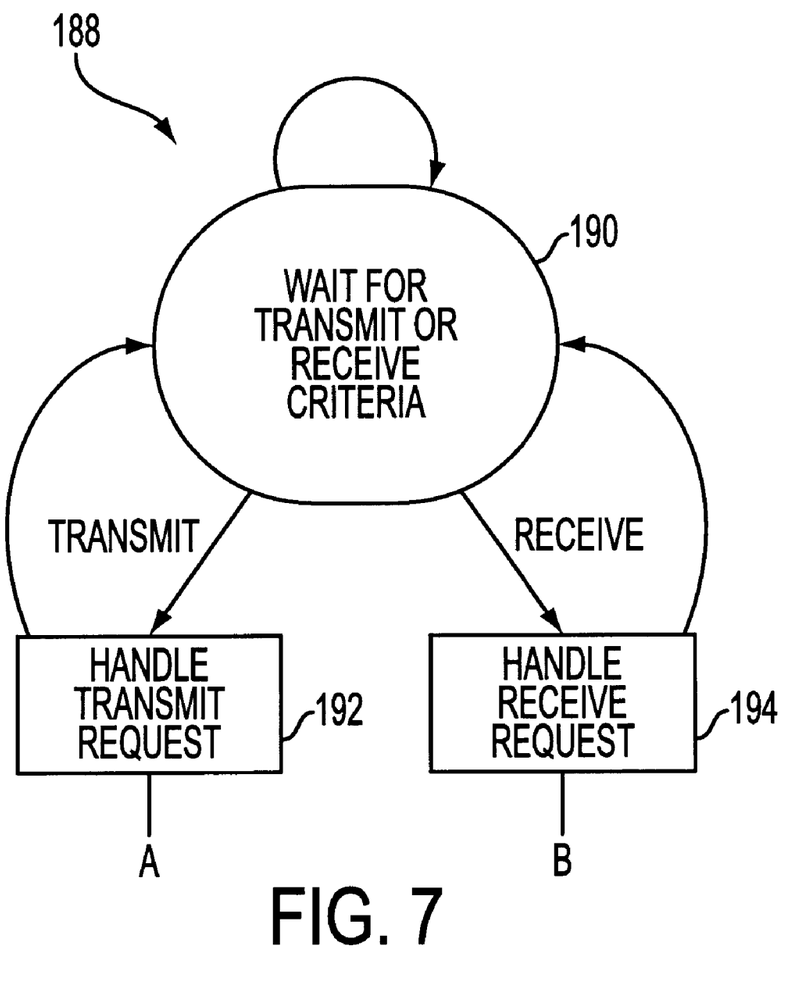
FIG. 7 is a flow diagram of the process implemented by the state machine of FIG. 6A.

A process 188 implemented by the state machine 180 is illustrated in FIG. 7. The process 188 begins with a wait loop 190 to await a transmit or receive criteria. If a transmit criteria is received, an action 192 handles the transmit request. If a receive criteria is detected, an action 194 handles the receive request. Both the handling of the transmit request, and the receive request will be discussed in greater detail subsequently.

Figure 7A:
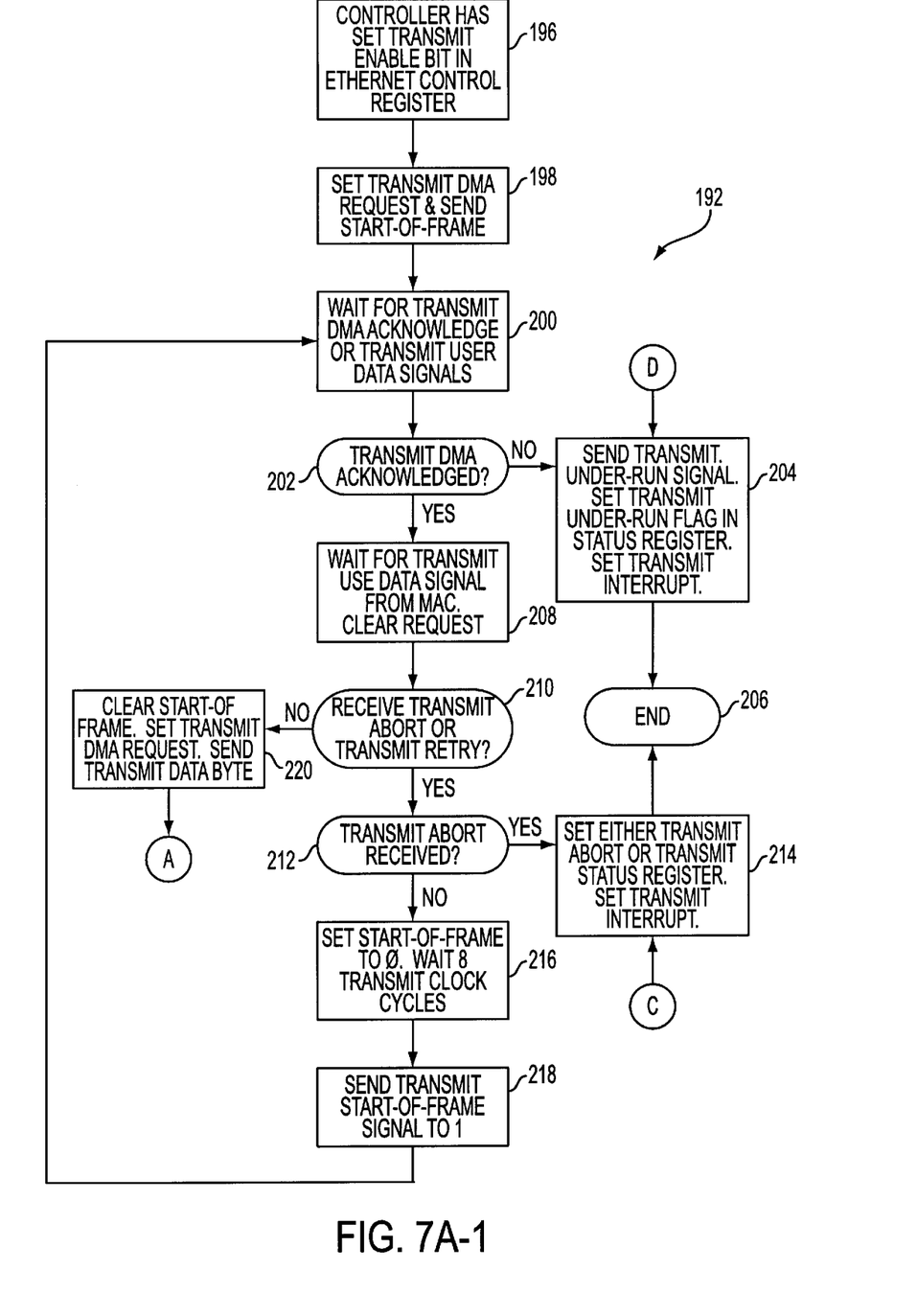
Figure 7A:
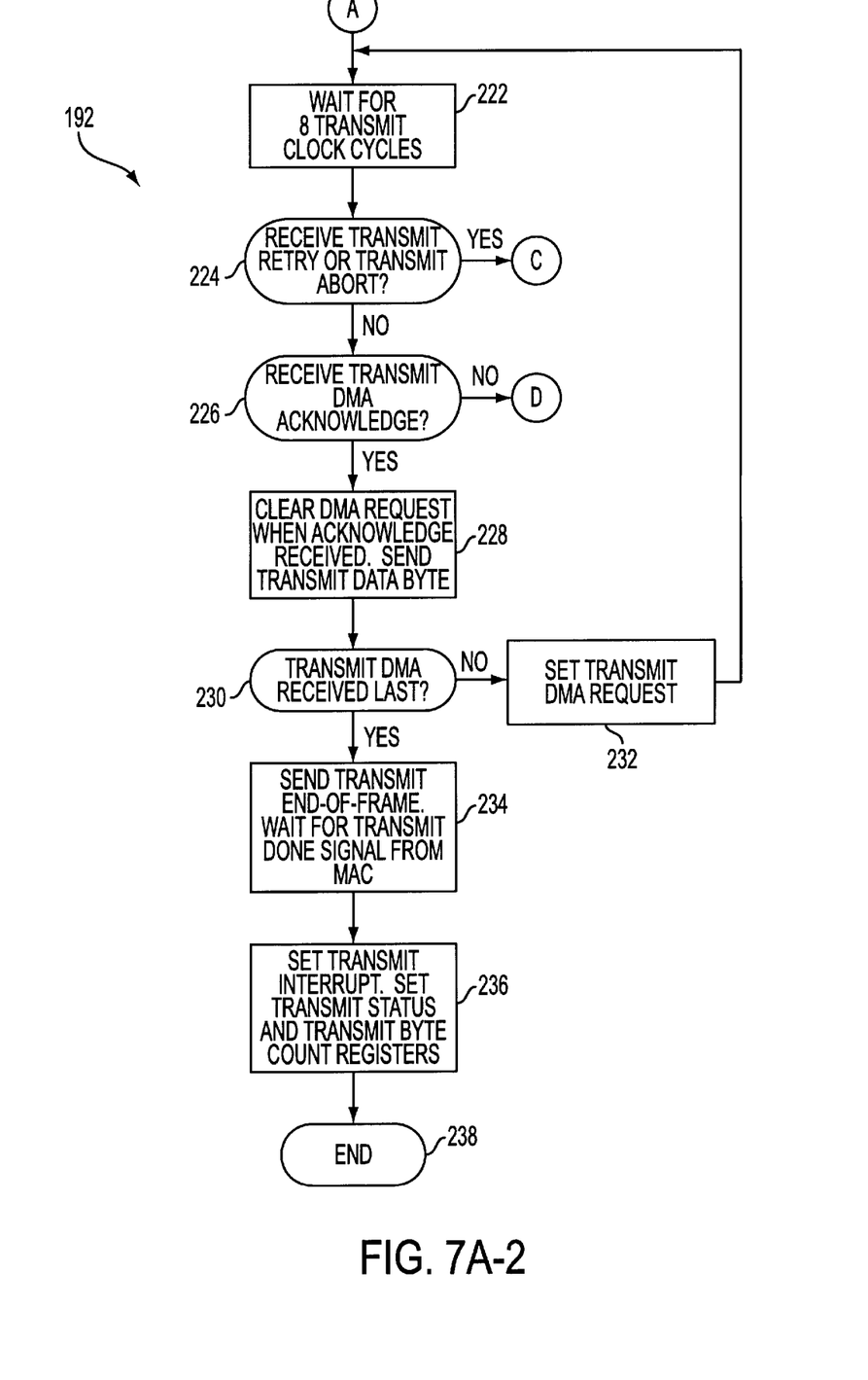

The process 192 "Handle Transmit Request" of FIG. 7 is illustrated in FIGS. 7A-1 and 7A-2. More particularly, the transmit criteria is determined by decision 196 when the controller has set the transmit enable bit in the Ethernet control register. The process 192 then continues with an action 198 to set the transmit DMA request and to send the "start of frame," which is a signal to the MAC to indicate that it should transfer an Ethernet preamble followed by a first byte of data. Next, in an action 200, there is a wait for transmit DMA acknowledge or transmit user data signals. A decision 202 then determines whether the transmit DMA was acknowledged. If not, an action 204 sends a transmit under-run signal (i.e. an indication that it is unable to provide data to transmit in time). Further, action 204 sets the transmit under-run flag in the status register and sets the transmit interrupt. The process 192 is then completed at 206.

If decision 202 determines that a transmit DMA was acknowledged, then action 208 waits for a "transmit use" data signal from the MAC indicating that the MAC is ready for the next byte, and then completes the request, in an action 208. The decision 210 then determines whether there has been received a "transmit abort" (the MAC is unable to send a packet) or a "transmit retry" (a collision has occurred). If there has been, the decision 212 determines whether a transmit abort has been received. If so, an action 214 sets either transmit abort or transmit retry register and the transmit interrupt is also set prior to the termination of the process at 206.

If a transmit abort was not received as determined by decision 212, action 216 clears the start-of-frame or SOF. The process then waits eight transmit clock cycles before an action 218 sets a start-of-frame signal to 1. Process control then returns to action 200.

If decision 210 determines that a transmit abort or transmit retry has not been received, then action 220 clears the start-of-frame. Action 220 also sets the transmit DMA request and sends a transmit data byte.

After the completion of the action 220, process control is turned over to an action 222 (see FIG. 7A-2). In action 222, the process waits for eight transmit clock cycles. Then, a decision 224 determines whether the transmit retry or transmit abort has been received. If it has, process control is returned to action 214 (see FIG. 7A-1). If not, decision 226 determines whether a transmit DMA acknowledge has been received. If not, process control is returned to action 204 (see FIG. 7A-1). If a transmit DMA acknowledge has been received, an action 228 clears the DMA request when the acknowledgment has been received. A transmit data byte is then sent. A decision 230 is then made as to whether the transmit DMA has been received last. If not, then action 232 sets the transmit DMA request and process control is returned to action 222. If the transmit DMA has been received last, an action 234 sends a transmit end-of-frame and the process waits for transmit done signal from the MAC. Finally, an action 236 sets the transmit interrupt, sets the transmit status, and transmit byte registers, and the process 192 is completed at 238.

Figure 7B:
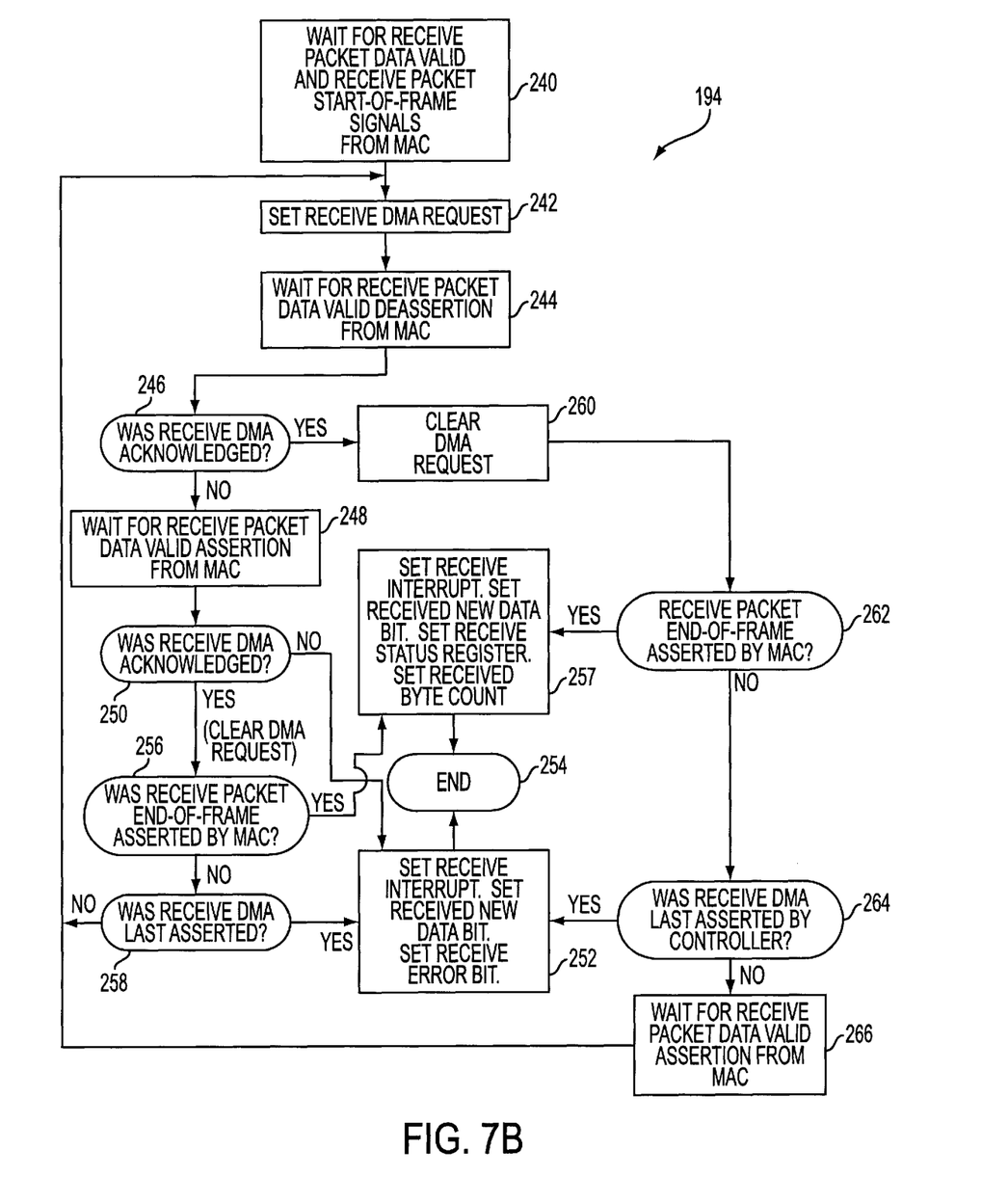
FIG. 7B is a flow diagram of the "Handle Receive Request Process" of FIG. 7.

In FIG. 7B, the process "Handle Receive Request" 194 of FIG. 7 is illustrated in greater detail. The receive criteria of action 240 is to wait for a receive packet data valid and receive packet start-of-frame signal from the MAC. An action 242 then sets the receive DMA request. An action 244 waits for the receive packet data valid de-assertion from the MAC, and a decision 246 determines whether the received DMA was acknowledged. If not, an action 248 waits for receive packet data valid assertion from the MAC, and a decision 250 determines whether the received DMA was acknowledged. If it was not, then action 252 sets the receive interrupt, sets the received new data byte and sets the received error byte. The process 194 is then completed at 254.

If decision 250 determines that a received DMA was acknowledged (i.e., there was a clear DMA request) a decision 256 determines whether a received packet end-of-frame was asserted by the MAC. If it was, an action 257 sets the received interrupt, sets the received new data byte, sets the received data register, and sets the received byte count. The process is then completed at 254.

If the received packet end-of-frame was not asserted by the MAC as determined by decision 256, a decision 258 determines whether the received DMA was last asserted. If it was, process control is turned over to action 252. If not, process control returns to 242.

If decision 246 determines that the received DMA acknowledge was received, an action 260 clears the DMA request, and a decision 262 determines whether the packet end-of-frame was asserted by the MAC. If it was, process control is turned over to action 257, otherwise a decision 264 determines whether the received DMA was last asserted by the controller. If it was, process control is turned over to action 252 and, if not, process control is turned over to action 266 to wait for a received packet data valid assertion from the MAC. Process control then returns to action 242.

Figure 8:
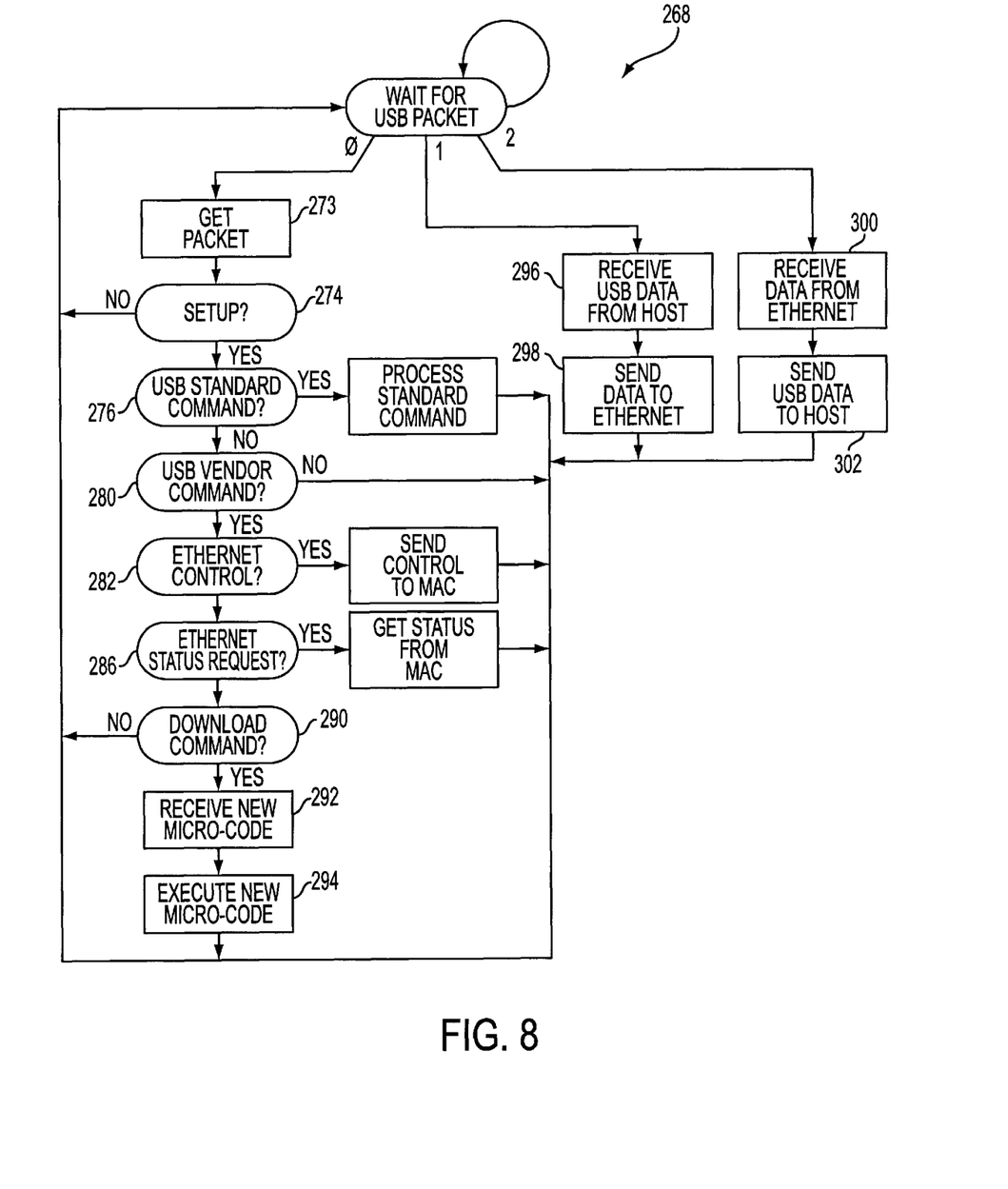
FIG. 8 is a flow diagram of a process implemented on the microprocessor of FIG. 2 and stored in one or more of the memories RAM and ROM of FIG. 2.

In FIG. 8, a process 268 executing on microprocessor 58 (see FIG. 2) is illustrated in flow diagram form. The process 268 is interrupt driven with interrupt levels 0, 1, and 2. More particularly, the 0 interrupt is the "USB End Point 0" interrupt, the interrupt 1 is the "USB End Point 1" interrupt, and the interrupt 2 is the "USB End Point 2" interrupt.

Process 268 includes a interrupt wait loop 270 with interrupt vectors 0, 1, and 2. When a USB End Point interrupt is detected, an action 272 receives the packet and a decision 274 determines whether it is a "setup." If not, process control returns to action 272 to get another packet. If it is a setup, the decision 276 determines whether it is a USB standard command and, if so, an action 278 processes this standard command before returning process control to action 272. If it is not a standard USB command the decision 280 determines whether it is a USB vendor command. If not, process control is returned to action 272.

If it is a USB vendor command, a decision 282 determines whether it is an Ethernet control command. If so, an action 284 sends the control to the MAC and process control returns to action 272. Otherwise, decision 286 determines whether it is an Ethernet status request. If so, the status is received from the MAC in an action 288 and process control returns to action 272 to receive another packet. If the decision 286 determines that it is not an Ethernet status request, the decision 290 determines whether it is a "down load" command. If not, process control is returned to action 272. If it is a down load command, an action 292 receives new program code from the host, and an action 294 executes the new code. This functionality allows new communication protocol drivers to be downloaded into the circuit. The process control then returns to action 272.

If the wait loop 270 receives a USB end point 1 interrupt, an action 296 waits for USB data from the host. An action 298 then sends the data to the Ethernet, and process control returns to action 296. If the interrupt wait loop 270 receives a USB end point 2, an action 300 waits for data from the Ethernet. Once the data has been received, an action 302 sends the USB data to the host, and returns process control to action 300.

The shared memory, accessed by DMA circuitry, of the digital protocol translator 50 allows for a very compact integrated circuit design or "form factor." An implementation of the present invention (absent the transformer, which is difficult to integrate) is formed on a single, square integrated circuit chip, e.g. a chip approximately ⅜ inches on a side, or even smaller. This form factor allows the digital protocol translator 50 to fit within a very compact connector housing, such as within a USB connector housing. The integrated circuit chip is typically mounted on a small, thin P.C. board, and is wired to various conductors of the cable. Preferably, the integrated circuit chip derives its power from the cable, such that no external power supplies are required. The memory design permits interfacing to external SRAM, DRAM and ROM memory 73 should additional memory be required beyond that which is "on chip." In addition, and $I^2C$ interface may be included for the inclusion of serial EPROMS, such as EPROM 75. The EPROMS can be used to store serial numbers, manufacturer ID's, and other product code information.

The described embodiment of the present invention has been designed to provide an easy-to-use interface between USB and Ethernet protocols. The USB side supports 12 M bits/second transfer rates, while the Ethernet side supports full duplex operation conforming to 802.3 specifications (incorporated herein by reference).

While the present invention has been described in terms of several preferred embodiments, it will be appreciated various modifications, permutations, and equivalents of these preferred embodiments will become clear to those skilled in the art upon a reading of the forgoing descriptions and a study of the drawings. It is therefore intended that the following appended claims include all such modifications, permutations, and equivalents as fall within the true spirit and scope of the present invention.

What is claimed is:

1. A single chip digital protocol translator comprising;
   first protocol circuitry having a first I/O port adapted to communicate using a first digital protocol, said first protocol circuitry including a first controller;
   second protocol circuitry having a second I/O port adapted to communicate using a second digital protocol different from said first digital protocol, said second protocol circuitry including a second controller in communication with said first controller;
   whereby communications between said first I/O port and said second I/O port are translated between said first protocol and said second protocol;
   wherein said first protocol circuitry and said second protocol circuitry are integrated on a single chip; and
   a digital microprocessor and digital memory integrated on said chip, said digital memory being coupled to said digital microprocessor, said digital microprocessor operating under program control stored in said digital memory and communicating with both said first controller and said second controller.

2. A digital protocol translator comprising:
   first protocol circuitry having a first I/O port adapted to communicate using a first digital protocol, said first protocol circuitry including a first controller;

second protocol circuitry having a second I/O port adapted to communicate using a second digital protocol different from said first digital protocol, said second protocol circuitry including a second controller in communication with said first controller;

whereby communications between said first I/O port and said second I/O port are translated between said first protocol and said second protocol; and wherein said first controller includes a first DMA interface and a first state machine separate from and communicating with said first DMA interface.

3. A digital protocol translator as recited in claim 1 wherein said digital memory includes both fixed memory and read/write memory.

4. A digital protocol translator as recited in claim 2, wherein said second controller includes a second DMA interface and a second state machine separate from and communicating with said second DMA interface.

5. A digital protocol translator as recited in claim 2, wherein said first controller further includes a plurality of registers communicating with said first state machine.

6. A digital protocol translator comprising:

first protocol circuitry having a first I/O port adapted to communicate using a first digital protocol, said first protocol circuitry including a first controller;

second protocol circuitry having a second I/O port adapted to communicate using a second digital protocol different from said first digital protocol, said second protocol circuitry including a second controller in communication with said first controller;

a digital microprocessor and semiconductor digital memory coupled to said digital microprocessor, said digital microprocessor operating under program control stored in said semiconductor digital memory and communicating with both said first controller and said second controller;

whereby communications between said first I/O port and said second I/O port are translated between said first protocol and said second protocol; and wherein said semiconductor digital memory includes fixed memory and microprocessor program instructions defining a plurality of protocols are stored within said fixed memory.

7. A digital protocol translator as recited in claim 3 wherein microprocessor instructions defining a plurality of protocols are stored within said read/write memory.

8. A digital protocol translator as recited in claim 6, wherein said first protocol circuitry, said second protocol circuitry, said digital microprocessor and said semiconductor digital memory are integrated on a single chip.

9. A digital protocol translator comprising:

first protocol circuitry having a first I/O port adapted to communicate using a first digital protocol, said first protocol circuitry including a first controller;

second protocol circuitry having a second I/O port adapted to communicate using a second digital protocol different from said first digital protocol, said second protocol circuitry including a second controller in communication with said first controller;

a digital microprocessor and semiconductor memory coupled to said digital microprocessor, said digital microprocessor operating under program control stored in said semiconductor memory and communicating with both said first controller and said second controller;

whereby communications between said first I/O port and said second I/O port are translated between said first protocol and said second protocol; and wherein said semiconductor memory includes semiconductor read/write memory, and wherein microprocessor program instructions defining a plurality of protocols are loaded into said semiconductor read/write memory through at least one of said first I/O port and said second I/O port, and wherein said first protocol circuitry, said second protocol circuitry, said digital microprocessor, and said semiconductor memory are integrated on a single chip.

10. A digital protocol translator comprising:

first protocol circuitry having a first I/O port adapted to communicate using a first digital protocol, said first protocol circuitry including a first controller;

second protocol circuitry having a second I/O port communicating using a second digital protocol different from said first digital protocol, said second protocol circuitry including a second controller in communication with said first controller;

whereby communications between said first I/O port and said second I/O port are translated between said first protocol and said second protocol; and wherein said first protocol is a USB protocol, and wherein said second protocol is an Ethernet protocol.

11. A digital protocol translator as recited in claim 10 wherein said first protocol circuitry and said second protocol circuitry are integrated on a single chip.

12. A digital translator as recited in claim 10, wherein said first protocol circuitry includes a first DMA interface and a first state machine separate from and communicating with said first DMA interface.

13. A digital protocol translator as recited in claim 10 farther comprising a digital memory and wherein said first controller includes a first DMA interface capable of accessing said digital memory and said second controller includes a second DMA interface capable of accessing said digital memory.

14. A digital protocol translator as recited in claim 10 further comprising a digital microprocessor and semiconductor memory coupled to said digital microprocessor, said digital microprocessor operating under program control stored in said semiconductor memory and communicating with both said first controller and said second controller, and wherein said semiconductor memory includes semiconductor fixed memory and wherein microprocessor program instructions defining a plurality of protocols are stored within said semiconductor fixed memory.

15. A digital protocol translator as recited in claim 10 further comprising a digital microprocessor and semiconductor memory coupled to said digital microprocessor, said digital microprocessor operating under program control stored in said semiconductor memory and communicating with both said first controller and said second controller, and wherein said semiconductor memory includes semiconductor read/write memory and wherein microprocessor program instructions defining a plurality of protocols are loaded into said semiconductor read/write memory through at least one of said first I/O port and said second I/O port.

16. A digital protocol translator comprising:

first protocol circuitry having a first I/O port adapted to communicate using a first digital protocol, said first protocol circuitry including a first controller;

second protocol circuitry having a second I/O port adapted to communicate using a second digital protocol different from said first digital protocol, said second protocol circuitry including a second controller in communication with said first controller;

a cable assembly including a first connector, a second connector, and a cable extending between said first connector and said second connector, wherein said first protocol circuitry and said second protocol circuitry are located within said cable assembly and whereby said communications between said first I/O port and said second I/O port are translated between said first protocol and said second protocol.

17. A digital protocol translator as recited in claim 16 wherein at least one of said first protocol circuitry and said second protocol circuitry are located within one of said first connector and said second connector.

18. A digital protocol translator as recited in claim 16 wherein at least one of said first protocol circuitry and said second protocol circuitry are located within said cable of said cable assembly.

19. A digital protocol translator as recited in claim 18 wherein said at least one of said first protocol circuitry and said second protocol circuitry are located within a dongle forming a part of said cable of said cable assembly.

20. A method for translating digital communications comprising:

receiving into a first protocol circuitry a first digital communication using a first digital protocol;

processing said first digital communication within said first protocol circuitry under a direction of a first controller;

receiving into a second protocol circuitry a processed first digital communication output of said first protocol circuitry;

processing said processed first digital communication output within said second protocol circuitry;

outputting a translated first digital communication from said second protocol circuitry; and wherein said first digital protocol is a USB protocol and wherein said second digital protocol is an Ethernet protocol.

21. A method of translating digital communications as recited in claim 20 further comprising:

receiving into said second protocol circuitry a second digital communication using said second digital protocol;

processing said second digital communication within said second protocol circuitry under a direction of a second controller;

receiving into said first protocol circuitry a processed second digital communication output of said second protocol circuitry;

processing said processed second digital communication output within said first protocol circuitry; and outputting a translated second digital communication from said first protocol circuitry.

22. A method of translating digital communications as recited in claim 20 further comprising:

processing program instructions within a digital microprocessor coupled to said first protocol circuitry and said second protocol circuitry to coordinate and control the translating process, said program instructions being stored in a memory coupled to said digital microprocessor.

23. A method for translating digital communications comprising:

receiving into a first protocol circuitry a first digital communication using a first digital protocol, processing said first digital communication within said first protocol circuitry under a direction of a first controller;

receiving into a second protocol circuitry a processed first digital communication output of said first protocol circuitry;

processing said processed first digital communication output within said second protocol circuitry;

outputting a translated first digital communication from said second protocol circuitry;

processing microprocessor program instructions defining a plurality of protocols within a digital microprocessor coupled to said first protocol circuitry and; said second protocol circuitry; and wherein said microprocessor program instructions are stored within a semiconductor fixed memory.

24. A method for translating digital communications as recited in claim 22 wherein said program instructions are stored, at least in part, within a read/write memory.

25. A method for translating digital communications comprising:

receiving into a first protocol circuitry through a first I/O port a first digital communication using a first digital protocol;

processing said first digital communication within said first protocol circuitry under a direction of a first controller;

receiving into a second protocol circuitry a processed first digital communication output of said first protocol circuitry;

processing said processed first digital communication output within said second protocol circuitry;

outputting a translated digital communication from said second protocol circuitry through a second I/O port; and processing microprocessor program instructions defining a plurality of protocols within a digital microprocessor coupled to said first protocol circuitry and said second protocol circuitry;

wherein said microprocessor program instructions are loaded into a semiconductor read/write memory through at least one of said first I/O port and said second I/O port.

26. A digital protocol translator comprising:

first protocol circuitry having a first I/O port adapted to communicate using a first digital protocol, said first protocol circuitry including a first controller;

second protocol circuitry having a second I/O port adapted to communicate using a second digital protocol different from said first digital protocol, said second protocol circuitry including a second controller in communication with said first controller;

a digital microprocessor and digital memory coupled to said digital microprocessor, said digital microprocessor operating under program control stored in said digital memory and communicating with both said first controller and said second controller;

whereby communications between said first I/O port and said second I/O port are translated between said first protocol and said second protocol; and wherein said first digital protocol is a USB protocol and wherein said second digital protocol is an Ethernet protocol.

27. A digital protocol translator comprising:

first protocol circuitry having a first I/O port adapted to communicate using a first digital protocol, said first protocol circuitry comprising a first controller including a first DMA interface;

second protocol circuitry having a second I/O port adapted to communicate using a second digital protocol different from said first digital protocol, said second protocol circuitry comprising a second controller in communication with said first controller, said second controller including a second DMA interface; and a digital memory capable of being accessed both by the first and the second DMA interface;

whereby communications between said first I/O port and said second I/O port are translated between said first protocol and said second protocol.

28. A digital protocol translator as recited in claim 27, wherein said first protocol circuitry has a first state machine separate from and communicating with said first DMA interface.

29. A digital protocol translator as recited in claim 28, wherein said second protocol circuitry has a second state machine separate from and communicating with said second DMA interface.

30. A digital protocol translator as recited in claim 27, wherein said first protocol circuitry, said second protocol circuitry and said digital memory are integrated on a single chip.

31. A method for translating digital communications comprising:

receiving into a first protocol circuitry a first digital communication using a first digital protocol;

processing said first digital communication within said first protocol circuitry under a direction of a first state machine within a first controller;

sending a processed first digital communication output of said first protocol circuitry via a first DMA interface, wherein and said first state machine is separate from and communicating with said first DMA interface;

receiving into a second protocol circuitry said processed first digital communication output of said first protocol circuitry;

processing said processed first digital communication output within said second protocol circuitry under a direction of a second controller; and outputting a translated digital communication from said second protocol circuitry.

32. A method for translating digital communications as recited in claim 31, wherein said receiving into a second protocol circuitry is performed via a second DMA interface, wherein and said second state machine is separate from and communicating with said second DMA interface, and said processing of said processed first digital communication output is performed under the direction of a second state machine within said second controller.

33. A method for translating digital communications comprising:

receiving into a first protocol circuitry a first digital communication using a first digital protocol;

processing said first digital communication within said first protocol circuitry under a direction of a first controller;

sending a processed first digital communication output of said first protocol circuitry via a first DMA interface to a digital memory;

receiving into a second protocol circuitry said processed first digital communication output from said digital memory via a second DMA interface;

processing said processed first digital communication output within said second protocol circuitry under a direction of a second controller; and outputting a translated digital communication from said second protocol circuitry.

34. A method for translating digital communications as recited in claim 33, wherein said processing of said first digital communication is performed under the direction of a first state machine within said first controller.

35. A method for translating digital communications as recited in claim 34, wherein said processing of said processed first digital communication output is performed under the direction of a second state machine within said second controller.

* * * * *